United States Patent
Moreau et al.

(10) Patent No.: US 7,032,788 B2
(45) Date of Patent: Apr. 25, 2006

(54) METERING DEVICE FOR CONTAINER

(75) Inventors: Fabrice Moreau, Tassin la Demi-Lune (FR); Patrick Pioffet, Fleurieu sur Saône (FR); Pierre Locoge, Dardilly (FR)

(73) Assignee: OMS Investments, Inc., Santa Monica, CA (US)

( * ) Notice: Subject to any disclaimer, the term of this patent is extended or adjusted under 35 U.S.C. 154(b) by 371 days.

(21) Appl. No.: 10/344,444

(22) PCT Filed: Aug. 7, 2001

(86) PCT No.: PCT/US01/41591

§ 371 (c)(1),
(2), (4) Date: Feb. 11, 2003

(87) PCT Pub. No.: WO02/12838

PCT Pub. Date: Feb. 14, 2002

(65) Prior Publication Data

US 2003/0164203 A1    Sep. 4, 2003

(30) Foreign Application Priority Data

Aug. 9, 2000    (FR) .................................. 00 10490

(51) Int. Cl.
*G01F 11/26* (2006.01)
*G01F 11/28* (2006.01)

(52) U.S. Cl. ........................ 222/455; 222/442; 222/456

(58) Field of Classification Search ................. 222/455, 222/454, 456, 457, 425, 442, 438
See application file for complete search history.

(56) References Cited

U.S. PATENT DOCUMENTS

| 2,387,374 | A |   | 10/1945 | Waters |          |
|-----------|---|---|---------|--------|----------|
| 2,664,228 | A |   | 12/1953 | Radeloff et al. | |
| 3,023,937 | A | * | 3/1962  | Matter | ........................ 222/440 |
| 3,841,534 | A | * | 10/1974 | Hirdes | ........................ 222/457 |
| 4,614,285 | A |   | 9/1986  | Fudalla et al. | |
| 5,129,561 | A | * | 7/1992  | Drobish | ...................... 222/455 |
| 5,148,953 | A | * | 9/1992  | Fudalla | ........................ 222/442 |

\* cited by examiner

*Primary Examiner*—Kevin Shaver
*Assistant Examiner*—Stephanie L. Willatt
(74) *Attorney, Agent, or Firm*—Welsh & Katz, Ltd.

(57) ABSTRACT

A container with a metering apparatus and a process for metering liquid from the container where the metering apparatus includes an upper chamber and a coaxial lower metering chamber. Inverting the container dispenses liquid in the metering chamber and simultaneously introduces liquid from the container into the upper chamber. When the container is returned to an upright position, a portion of the liquid in the upper chamber flows to and fills the metering chamber; however, a surplus portion of the liquid remains in the upper chamber even when the container is again inverted. The surplus portion of the liquid never returns to the container.

3 Claims, 4 Drawing Sheets

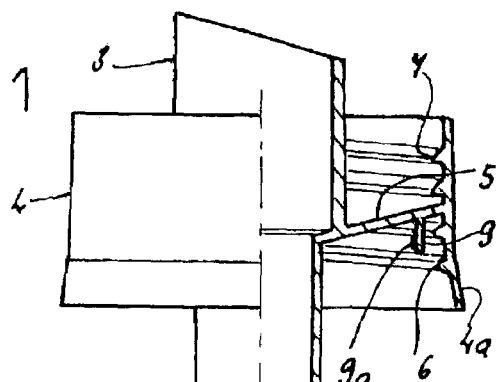
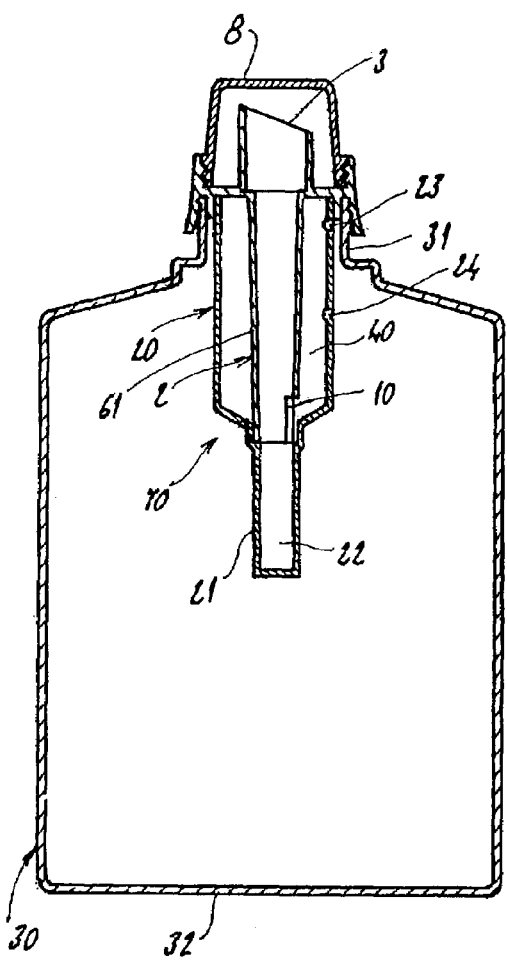
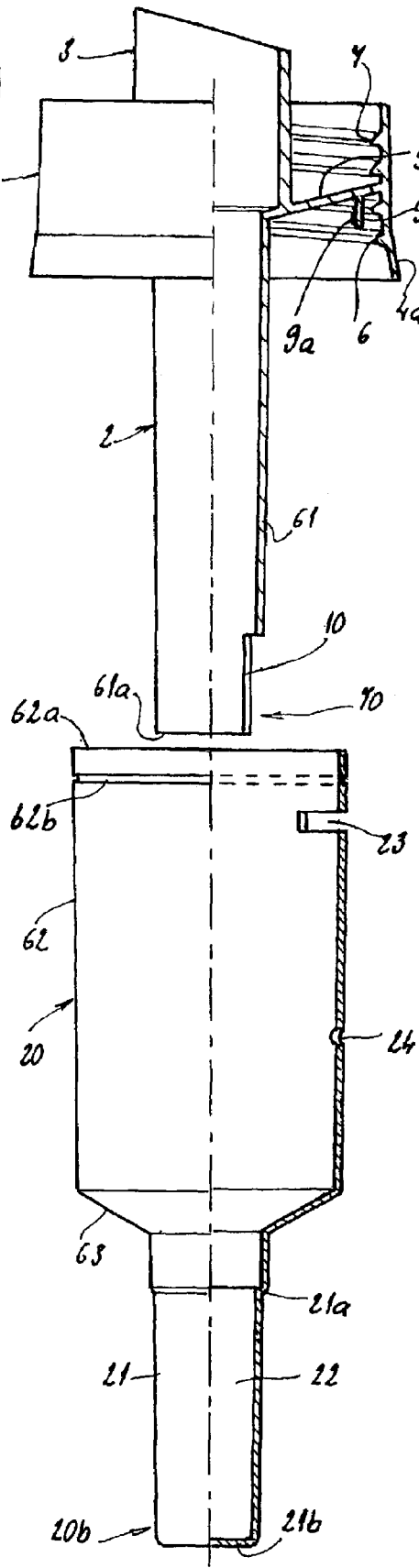

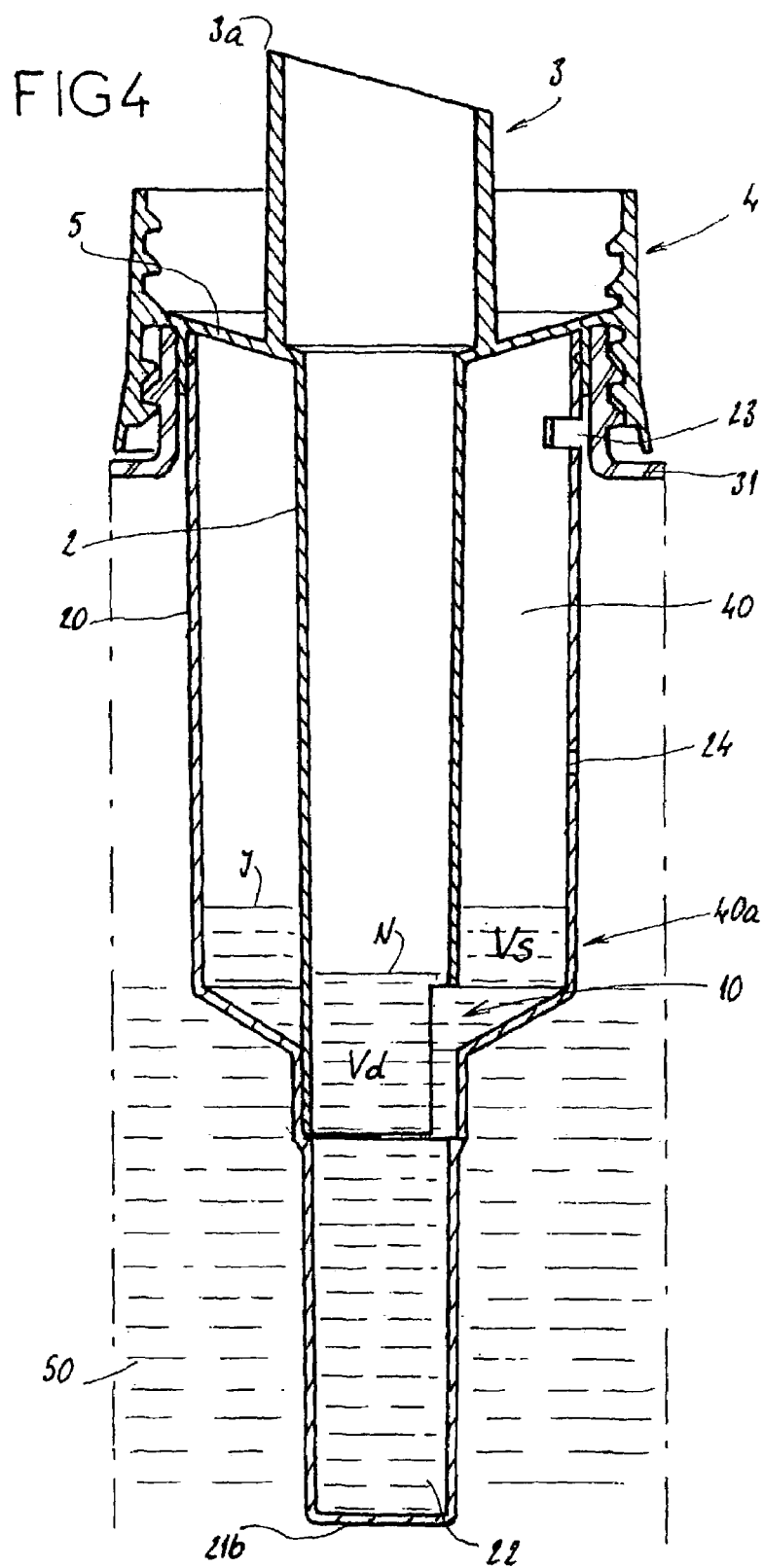

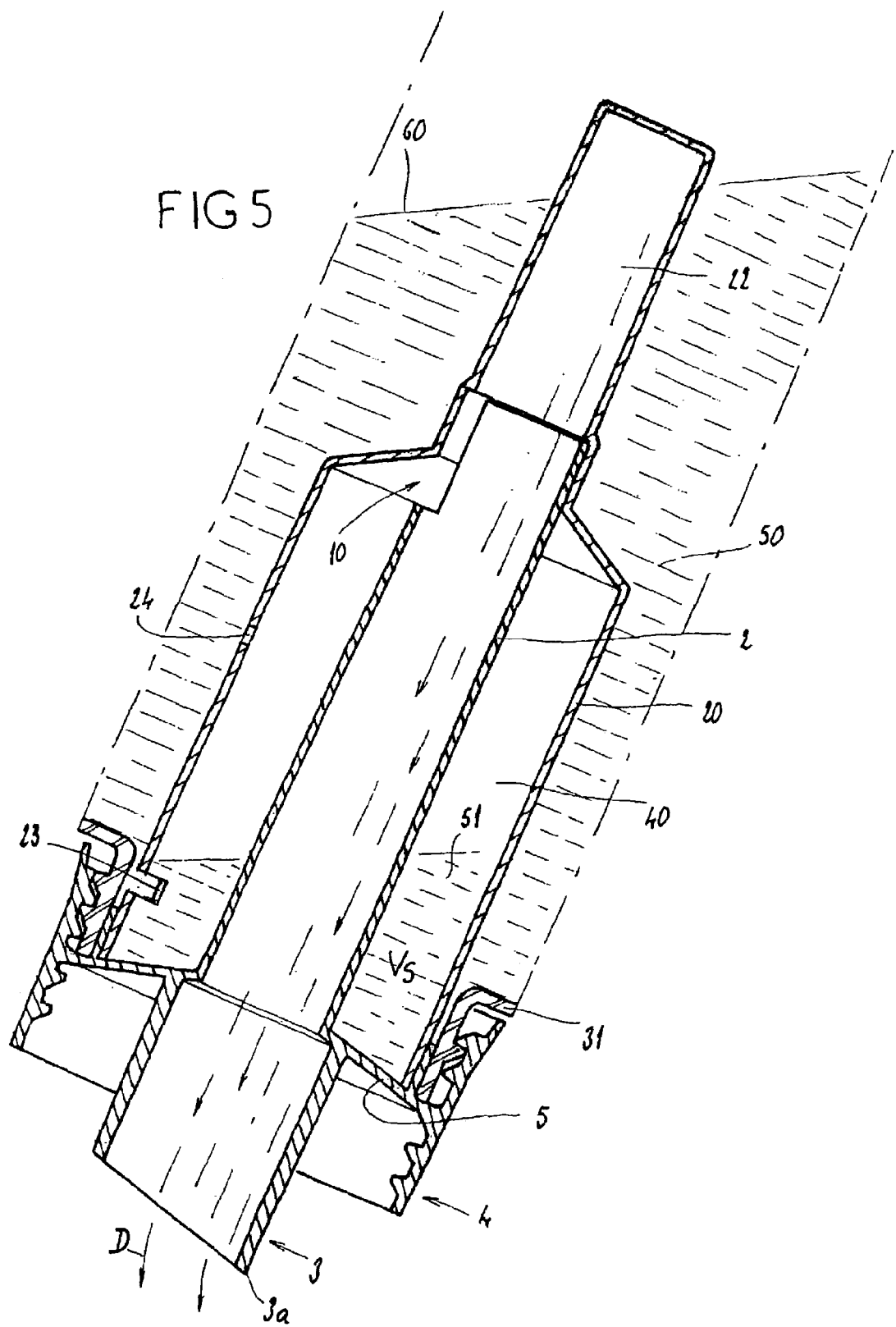

METERING DEVICE FOR CONTAINER

TECHNICAL FIELD

The present invention relates to a metering device to be mounted in or on the neck of the container containing a liquid to be poured out in successive, separate measures. A device of this type may also be incorporated into or belong to, by means of construction, a container containing a liquid to be poured out in measures.

"Measure of liquid" means a specific or measured amount removed from a much larger amount contained in a reservoir or container. The isolation or separation of this specific measure of liquid takes place within the context of the present invention by means of a withdrawal process, known per se, implemented by successive inversions of a container provided with a metering device. The "normal" position of the container corresponds to a position in which the said container rests on its base, and the "inverted" position corresponds to a position in which the neck of the said container is oriented downward, the container being pivoted through 180°, top to bottom, relative to its "normal" position.

BACKGROUND ART

Various metering devices are already known which have in common the characteristic whereby they include two compartments, namely a first, metering compartment filled with a predetermined volume of liquid in a first, inverted position of the container, and a second, reserve compartment communicating with the metering compartment so as to receive the predetermined volume of liquid contained in the metering compartment when the container is returned to its normal position. The reserve compartment furthermore communicates with an outlet of the metering device so as to pour out a predetermined measure of liquid which has previously been withdrawn and measured as indicated above. Pouring-out of the predetermined measure takes place simultaneously with the filling of the metering compartment.

A process is thus known withdrawal and pouring out of a predetermined measure of liquid from a said liquid contained in a container, the process comprising at least one sequence whereby, from a normal position of the said container, in which the said container rests on its base, successively the container is inverted, top to bottom, and then the said container is returned to the normal position, this being in order to proceed to the stages required for withdrawal and metering of the said liquid, in which:

(a) from the contents of the container, a predetermined amount of liquid, equal to the sum of the measure of the said liquid to be poured out plus a surplus of the said liquid is withdrawn and isolated from the said container, in a withdrawal chamber;

(b) from the predetermined amount of liquid, a metering chamber is filled by transfer from the withdrawal chamber, in order to obtain the said measure;

(c) and the said measure is poured out from the metering chamber.

It is known to produce a metering device for implementing the above mentioned process, comprising two coaxial elements, one which is tubular or internal, and the other which is cylindrical or external, together defining a withdrawal chamber and a metering chamber arranged one above the other in a reference "normal" position of the said device and communicating with one another at a level located between the two said chambers with the aid of a communication or transfer opening, the said withdrawal chamber communicating with the outside, for example the inside of a container at a low level and at an intermediate level, determining between them, in the withdrawal chamber and in the inverted position of the said device, a predetermined withdrawal volume which is by construction greater than the volume of the metering chamber.

By way of example of a device of this type, reference will made, for example, to document FR-A-2 590 555.

Document U.S. Pat. No. 5,148,953 or document GB-2 145 061 also disclose a process which operates according to the process described hereinabove.

In accordance with document U.S. Pat. No. 5,148,953, by virtue of one or a number of longitudinal slots (i.e. slots parallel to the axis of the device) provided in that part of the outer wall of the withdrawal chamber which extends from the level of the hole for communication between the two, withdrawal and metering, chambers, during or at the end of the stage of transfer from the withdrawal chamber to the metering chamber, the surplus of the liquid withdrawn relative to the amount strictly required for metering is evacuated outside the metering device and returns to the inside of the container. Thus, during the pouring-out stage, only the metered amount is evacuated to the outside of the metering device.

In accordance with document GB-2 145 061, at the end of the stage of transfer from the withdrawal chamber to the metering chamber, by virtue of an overflow means returning the surplus of the liquid withdrawn towards the outside of the metering device, i.e. into the container, a common level of the liquid, corresponding to that of the metered liquid, is established between the top of the metering chamber and the bottom of the withdrawal chamber so that there is practically no more surplus in the withdrawal chamber at the end of the transfer stage. Thus, during the pouring-out stage, practically only the metered amount is evacuated to the outside of the metering device.

The drawback with the aforesaid devices lies in the lack of accuracy of the metered amounts of liquid which are withdrawn and poured out, particularly when there is no longer a great deal of liquid in the container. In such a case in point, the hydrostatic pressure in the inverted position of the container may prove insufficient to completely fill the metering compartment.

This is particularly awkward when it is desired to pour out products of the liquid type which require precise metering.

Moreover, in known metering devices, it is necessary to prepare in advance a measure which is intended to be poured out and this remains stored, awaiting pouring-out. This may adversely affect metering in so far as a long period of non-use of the device or storage in a warm location, for example a greenhouse, leads to evaporation of at least a portion of the measure prepared in this way. In such a case, the actual amount of product delivered to a plant is unknown.

DISCLOSURE OF THE INVENTION

The object of the present invention is to produce a metering device which does not have the drawbacks of the prior art and makes it possible to obtain precise metering independently of the level of filling of the reservoir or container, of a period of non-use or of storage conditions of the container which includes the metering device.

A further object of the present invention is to simplify the structural elements of the metering device and consequently to reduce its cost price.

According to the invention, the process for withdrawal and pouring out implemented by successive inversions of the container from its normal position to its inverted position, and then vice versa, consists, in combination, of the following options:

during stage (b) of transfer from the withdrawal chamber to the metering chamber, a predetermined surplus of the liquid is retained in the said withdrawal chamber and, when filling of the metering chamber is complete, this forms a column of liquid charging the measure to be poured out;

and, during stage (c) of transfer, this predetermined, surplus is retained separately, this being in the withdrawal chamber, whilst the measure of liquid is poured out simultaneously, away from the said surplus, from the metering chamber.

According to the invention, the metering device includes a withdrawal chamber closed with respect to the outside in its lower part extending in terms of height from the communication or transfer opening so as to retain in the said withdrawal chamber, in the normal position, a predetermined surplus of liquid whose level rises above the communication opening.

One advantage of the metering device according to the invention lies in its structural simplicity: the metering device consists of only two pieces which are obtained by molding or injection-molding, for example, and which have simple shapes.

A further advantage of the device according to the invention is linked to the fact that accuracy of metering is not adversely affected either by an extended period of non-use or by a small amount of liquid remaining in the container.

BRIEF DESCRIPTION OF THE DRAWINGS

Further characteristics and advantages will likewise become apparent from the detailed description given hereinbelow with reference to the appended drawing, by way of non-limiting examples. In the appended drawing:

FIG. 1 shows an expanded and partially sectional view of the metering device according to the invention;

FIG. 2 shows an example of mounting the metering device on a container;

FIGS. 3, 4 and 5 diagrammatically show the stages of the process for withdrawal and pouring out according to the invention, implemented with a metering device according to the invention.

BEST MODE FOR CARRYING OUT THE INVENTION

Figure 3:
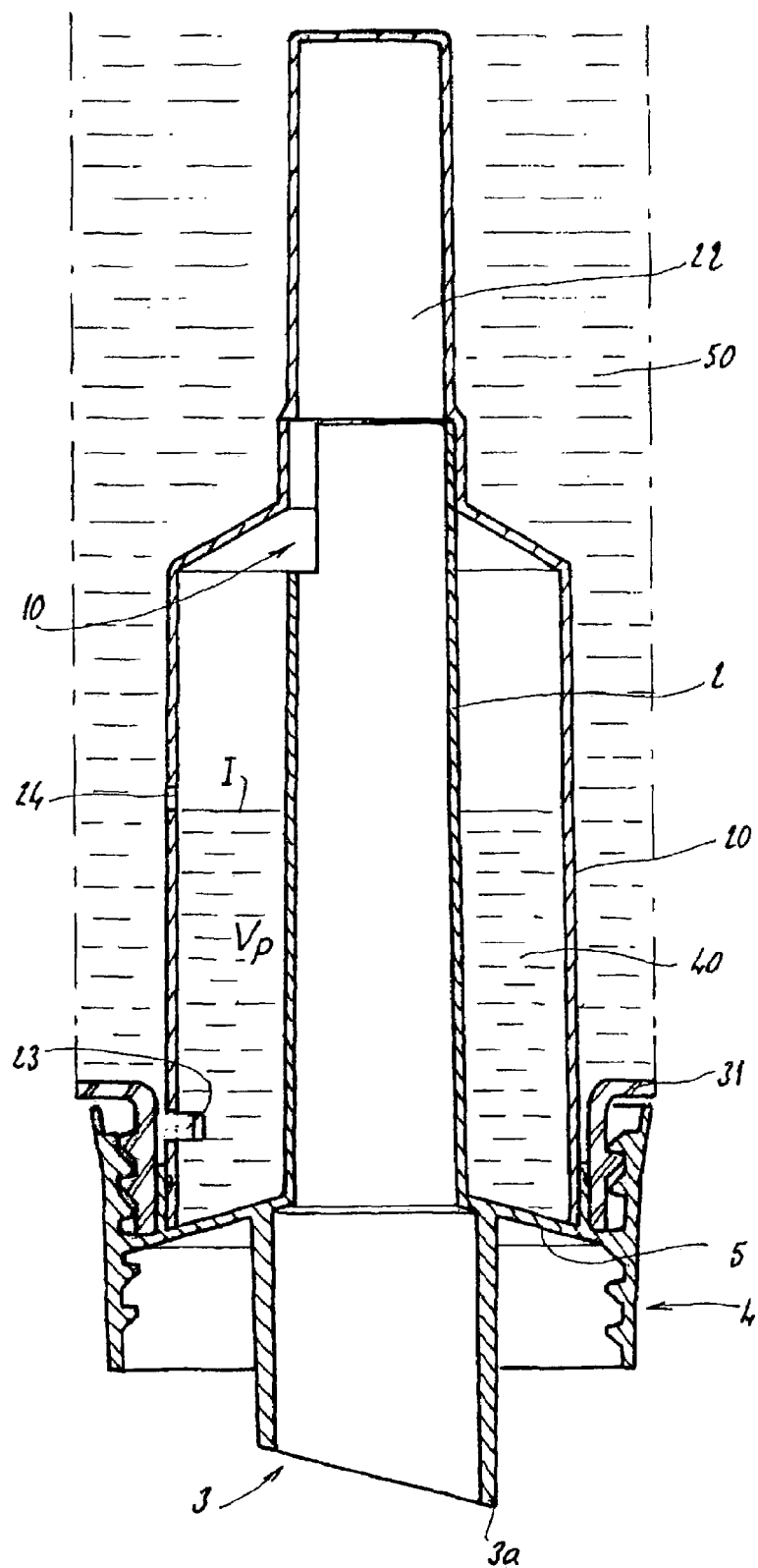

Generally speaking, as shown by FIG. 2, a metering device according to the invention, referenced 70, is obtained by the assembly or coaxial nesting of an internal tubular element 2 in an external cylindrical element 20. These two elements are each produced in monobloc fashion by means of injection-molding of a plastic material.

The tubular element 2 has a transfer tube 61 and a pouring spout 3 aligned coaxially and communicating with the said tube. This pouring spout has an internal cross section which is greater than that of the tube. A peripheral crown 4 is connected to the shoulder between tube 61 and pouring spout 3 by a continuous peripheral collar 5. The crown 4 is provided with a lower peripheral skirt 4a and, on either side of the collar 5, with a first, internal and lower screw thread 6, allowing screwing onto the externally threaded neck 31 of a container 30 and thus mounting on the container including the liquid to be poured out, and with a second, internal and upper screw thread 7 allowing the screwing-on of a cover 8 covering the internally threaded pouring spout.

The transfer tube 61 comprises a communication opening 10 which has the form of a through-notch from the lower border of the said tube, away from the pouring spout 3. The orientation of the pouring spout 3, i.e. its direction of pouring determined by its shape, and the position of the opening 10 are opposed by 180° about the common axis of the spout 3 and of the tube 61. Preferably, in a manner not shown in the drawing, a slot parallel to the said common axis may be provided in the cylindrical wall of the pouring spout 3, away from the direction of pouring, in order to guide the user in correctly orienting the pouring spout 3 relative to the container proper, for example to its handle. The end 61a of the transfer tube 61 opposite the pouring spout 3 is open.

The cylindrical element 20 includes, from the top downward, continuously and coaxially, a shell 62 of relatively wide cross section suitable for the passage of the transfer tube 61 of the tubular element 2, providing, with the latter, a withdrawal chamber 40, and a cap 21 of relatively narrow cross section, suitable for stopping the transfer tube 61, by virtue of a shoulder 21a provided in the upper part of the said cap 21, coming into contact with the border of the open lower end 61a of the transfer tube 61. The end 21b of the cap 21, opposite the shell 62, is closed, while the cap 21 and the shell 62 are connected by a frustoconical part 63.

The wall of the shell 62 includes, one above the other, and parallel to the common axis of the shell 62 and of the cap 21, a through-opening 23 for filling, of relatively wide cross section, and a through-opening 24 for overflow, of relatively small cross section.

Means for assembly or nesting between the tubular element 2 and the cylindrical element 20 are provided in the form of:

an outer peripheral groove 62b at the open end 62a of the shell 62;

a bead 9a projecting from the collar 5 inside the skirt 4a, arranged in a circular manner about the axis of the tubular element 2 and snap-fitting elastically inside the groove 62b.

The tubular 2 and cylindrical 20 elements are assembled as shown in FIG. 2 in order to obtain the metering device 70, and then the latter is screwed onto the neck 31 of the container 30, still as shown in FIG. 2.

In this assembled and mounted position of the metering device, it is possible to identify, with reference to FIG. 2:

a metering chamber 22, delimited by the inner part of the cap 21;

an annular withdrawal chamber 40 defined between the transfer tube 61 and the shell 62;

by indexing means which are not shown, the position recorded around the axis of the metering device 70 of the communication or transfer opening 10 on the one hand and of the filling 23 and overflow 24 openings on the other hand, all these openings being arranged at 180° about the same axis relative to the sense or direction of pouring defined by the pouring spout 3.

The withdrawal chamber 40 communicates with the inside of the container 30 principally by means of the filling opening 23, and with the metering chamber 22 by means of the communication or transfer opening 10. The metering chamber 22 does not communicate with the inside of the container 30, but with the outside of the container via the transfer tube 61 and the pouring spout 3.

In the reference position according to FIG. 2, the withdrawal chamber 40 and the metering chamber 22 are arranged one above the other and communicate at a level (that of the opening 10) located between the said chambers. The withdrawal chamber 40 communicates with the outside, namely the inside of the container 30, at an intermediate level (that of the opening 24) and at a low level (that of the opening 23), defining between them in the withdrawal chamber 40 and in the inverted position of the device 70 a predetermined withdrawal volume which corresponds to a predetermined amount of liquid withdrawn, which volume is by construction greater than the volume of the metering chamber 22. The withdrawal chamber 40 is closed vis-a-vis the outside (the volume accessible inside the container) at its end (lower part 40a) located in the vicinity of the communication opening 10. Between the level of the wall of the cylindrical element 20 facing the opening 10 and the level of the overflow opening 24 the said wall is solid about the axis of the metering device.

FIGS. 3, 4 and 5 diagrammatically show the operation of the metering device 70 mounted on the container 30, as shown in FIG. 2. Thus, FIG. 3 shows both the metering device and the container in an inverted position, top to bottom, the stopper 8 having been removed, in which position a liquid 50 contained in the container 30 enters the withdrawal chamber 40 for the first time via the filling opening 23. The liquid 50 thus fills the annular withdrawal chamber 40 up to a level I which corresponds to the position of the overflow opening 24 (cf. FIG. 3). In this position, the amount of liquid withdrawn Vp is much greater than the metered amount Vd (up to a level N in FIG. 4), which will be discussed hereinbelow, this excess constituting a predetermined surplus amount Vs remaining in the withdrawal chamber 40 of the metering device.

Turning in the opposite direction, bottom to top, into the normal position of the container/metering device assembly, therefore makes it possible to transfer the liquid contained in the annular withdrawal chamber 40 toward the metering chamber 22 (cf. FIG. 4).

The amount of liquid withdrawn and measured in the annular withdrawal chamber 40 makes it possible to fill the metering chamber 22 up to a filling level N of the tubular element 2. The said filling level N extends substantially at the same height as the communication or transfer opening 10 between the annular withdrawal chamber 40 and the metering chamber 22, in the position of FIG. 4, i.e. the normal position of the container 30. In this position, the metered amount Vd of liquid corresponds to the column of liquid between the base 21b of the cap 21 and the level N determined by the communication or transfer opening 10, in the nesting of the cylindrical parts of the cap 21 and of the tube 61, respectively.

The volume of liquid withdrawn in the annular chamber 40 is greater than the volume of the metering chamber 22, which allows a surplus of liquid 50, of predetermined volume Vs, to spread in the lower part 40a of the annular chamber 40 as far as a level J located above the filling level N and consequently well above the level of the opening 10 for communication between the chambers 40 and 22. A surplus of liquid Vs of this type between the levels N and J in the chamber 40, completely covering the opening 10, makes it possible to guarantee filling in practically every circumstance of the metering chamber 22 with a volume Vd. As will be seen hereinbelow, this surplus is permanent in the sense that it remains, always with the same volume Vs, inside the withdrawal chamber 40 in order to form, at the end of each operation of filling the metering chamber 22, a column of liquid charging the measure of volume Vd to be poured out, and doing so practically until complete emptying of the container 30.

The metering device is therefore ready for use. The pouring-out of the measure of liquid contained in the metering chamber 22 takes place by supplementary inversion of the container/metering device assembly, as shown in FIG. 5. During such inversion, the liquid contained in the metering chamber 22 is poured out via the pouring spout 3 in the direction of the arrows shown diagrammatically by the letter D in FIG. 5. The surplus of liquid of predetermined volume Vs which remains in the annular withdrawal chamber 40 is automatically and simultaneously separated from the measure being poured out, flows toward the sealed base of the chamber 40 formed at this moment by the peripheral collar 5, and remains in the withdrawal chamber 40. The surplus of liquid thus separated from the metered volume is, simultaneously with pouring-out from the metering chamber, supplemented by a further filling operation via the filling opening 23 in order to reconstitute the volume Vp. The withdrawal chamber 40 is then again filled with the liquid 50, the level of which may reach as far as the overflow opening 24, practically until complete emptying of the container 30. When pouring-out is complete, the metering device and container assembly may be turned again into its normal position, awaiting a further use, in the configuration shown in FIG. 4.

The surplus Vs of liquid remaining in the withdrawal chamber 40 is predetermined by construction such that, for example:
  it is at most equal to the volume Vd of the metering chamber 22;
  or is proportional to the volume Vd of the metering chamber 22 and, in particular, between 0.2 and 0.8 and, for example, between 0.2 and 0.6 times the volume of the metering chamber 22.

The metering device according to the invention applies, for example, to the dispensing of liquid fertilizer or of a liquid feed product.

The invention claimed is:

1. A container having a metering apparatus comprising:
a container holding a liquid; and
a metering apparatus located in the container, the metering apparatus including a metering chamber and a withdrawal chamber,
said withdrawal chamber being in communication with said metering chamber and with the liquid in said container,
said metering chamber and said withdrawal chamber being structured and dimensioned to enable liquid in said metering chamber to be dispensed from the container and liquid from said container to be introduced into said withdrawal chamber when said container is turned from a first position to a second position, and to enable a metering portion of the liquid in said withdrawal chamber to be transferred to said metering chamber when said container is returned from the second position to the first position in a manner such that a surplus of the liquid is retained in said withdrawal chamber after the metering portion of the liquid is transferred to the metering chamber,
said metering chamber and said withdrawal chamber being structured and dimensioned to enable the surplus of the liquid in the withdrawal chamber to be retained in said withdrawal chamber when the liquid in the metering chamber is dispensed, said metering chamber and said withdrawal chamber being structured and dimensioned such that the surplus portion of the liquid in the withdrawal chamber fails to return to the container, said metering apparatus including a first structure having a lower cylindrical portion forming said metering chamber integral with an upper cylindrical portion forming said withdrawal chamber, and a second structure having an open bottom, an open top and a cylindrical wall with a lower wall opening to communicate liquid in said upper cylindrical portion of said first structure with the lower cylindrical portion of said first structure, said upper cylindrical portion having a larger dimension than said lower cylindrical portion, and said upper cylindrical portion having two spaced apart side holes.

2. The container of claim 1 wherein:

said upper cylindrical portion of said first structure has a top opening; and said second structure includes a laterally directed collar wall to cover the top opening of the upper cylindrical portion of said first structure.

3. The container of claim 2 wherein:

said upper cylindrical portion of said first structure includes an annular groove; and said second structure includes a annular bead to engage said upper cylindrical portion of said first structure by snap fitting said bead in said groove.

* * * * *